United States Patent [19]

Pope

[11] Patent Number: 5,596,738
[45] Date of Patent: Jan. 21, 1997

[54] PERIPHERAL DEVICE CONTROL SYSTEM USING CHANGEABLE FIRMWARE IN A SINGLE FLASH MEMORY

[75] Inventor: Steven M. Pope, Los Gatos, Calif.

[73] Assignees: Teac Corporation, Teac, Japan; DZU Corporation, Sunnyvale, Calif.

[21] Appl. No.: 421,462

[22] Filed: Apr. 12, 1995

Related U.S. Application Data

[63] Continuation of Ser. No. 829,129, Jan. 31, 1992, abandoned.

[51] Int. Cl.$^6$ .................................................. G06F 9/06
[52] U.S. Cl. ........................ 395/430; 395/481; 395/492
[58] Field of Search ............................. 395/430, 481, 395/492

[56] References Cited

U.S. PATENT DOCUMENTS

| | | | |
|---|---|---|---|
| 4,034,411 | 7/1977 | Kraemer et al. | 360/98 |
| 4,130,845 | 12/1978 | Kulma | 360/97 |
| 4,280,155 | 7/1981 | Scott et al. | 360/98 |
| 4,405,100 | 9/1983 | Daniels | 244/3.1 |
| 4,568,988 | 2/1986 | McGinlay et al. | 360/77 |
| 4,636,905 | 1/1987 | Morimoto et al. | 360/137 |
| 4,639,863 | 1/1987 | Harrison et al. | 364/200 |
| 4,660,110 | 4/1987 | Iida et al. | 360/98 |
| 4,666,739 | 5/1987 | Roubal | 427/97 |
| 4,712,146 | 12/1987 | Moon et al. | 360/97 |
| 4,724,495 | 2/1988 | Hedberg et al. | 360/22 |
| 4,750,152 | 6/1988 | Yonekubo et al. | 369/46 |
| 4,790,912 | 12/1988 | Hotzman et al. | 204/15 |
| 4,810,333 | 3/1989 | Gulla et al. | 204/15 |
| 4,858,034 | 8/1989 | Hassel et al. | 360/51 |
| 4,920,434 | 4/1990 | Brown et al. | 360/77.08 |
| 4,930,029 | 5/1990 | Morita | 360/97.01 |
| 4,931,899 | 6/1990 | Osafune | 360/78.06 |
| 4,933,785 | 6/1990 | Morehouse et al. | 360/78.04 |
| 4,965,684 | 10/1990 | Stefansky | 360/78.12 |
| 4,991,129 | 2/1991 | Swartz | 364/707 |
| 4,992,899 | 2/1991 | Kaczeus et al. | 360/106 |
| 5,010,426 | 4/1991 | Krenz | 360/97.01 |
| 5,025,335 | 6/1991 | Stefansky | 360/97.01 |
| 5,025,336 | 6/1991 | Morehouse et al. | 360/97.02 |
| 5,027,242 | 6/1991 | Nishida et al. | 360/106 |
| 5,031,059 | 7/1991 | Yamaguchi et al. | 360/97.03 |

(List continued on next page.)

FOREIGN PATENT DOCUMENTS

| | | |
|---|---|---|
| 0161720 | 9/1982 | European Pat. Off. . |
| 0373043 | 6/1990 | European Pat. Off. . |
| 0534745A3 | 3/1993 | European Pat. Off. . |
| 0534745A2 | 3/1993 | European Pat. Off. . |
| 0555913A2 | 8/1993 | European Pat. Off. . |
| 0589708A2 | 3/1994 | European Pat. Off. . |
| 03150778 | 8/1989 | Japan . |
| 2051458 | 5/1980 | United Kingdom . |

OTHER PUBLICATIONS

Aerodynamic Aspects of Disk Files; R. Lennemann; Mar. 12, 1974.
New Packaging Strategy to Reduce System Costs; John D. Balde; 1984.
Future of Multichip Modulesin Electronics; Dr. Maurice G. Sage; 1989.
Multichip Module: Systems Advantages, Major Construction, and Material Technologies; R. Wayne Johnson, et al., Editor; 1990.
High–Performance PC XT/AT Disk controller; Apr. 1992.
Point 5: A New Concept in Data Storage; Kalok Corp.; 1993.
Hardcard: The Inside Story.

(List continued on next page.)

*Primary Examiner*—Reba I. Elmore
*Attorney, Agent, or Firm*—Brinks Hofer Gilson & Lione

[57] ABSTRACT

A peripheral device control system includes a single flash memory having a changeable portion for storing firmware for controlling the peripheral device and a preprogrammed portion containing control code. When it is desired to modify the changeable firmware, the control code is read from the flash memory to a storage area in the using system and is used to control the loading of the modified firmware in the flash memory.

20 Claims, 10 Drawing Sheets

U.S. PATENT DOCUMENTS

| | | | |
|---|---|---|---|
| 5,038,239 | 8/1991 | Vettel et al. | 360/98.01 |
| 5,041,924 | 8/1991 | Blackborrow et al. | 360/69 |
| 5,046,149 | 9/1991 | Nunan | 307/10.1 |
| 5,073,834 | 12/1991 | Best et al. | 360/77.08 |
| 5,077,722 | 12/1991 | Geist et al. | 369/75.1 |
| 5,079,655 | 1/1992 | Yagi | 360/97.02 |
| 5,095,396 | 3/1992 | Putnam et al. | 360/106 |
| 5,140,478 | 8/1992 | Yoshida | 360/97.01 |
| 5,170,299 | 12/1992 | Moon | 360/77.08 |
| 5,204,593 | 4/1993 | Ueki | 369/44.28 |
| 5,208,712 | 5/1993 | Hatch et al. | 360/98.01 |
| 5,210,660 | 5/1993 | Hetzler | 360/51 |
| 5,210,854 | 5/1993 | Beaverton et al. | 395/500 |
| 5,212,679 | 5/1993 | Tohkairin | 369/75.2 |
| 5,229,919 | 7/1993 | Chen | 361/685 |
| 5,243,479 | 9/1993 | Nakagoshi et al. | 360/98.01 |
| 5,262,705 | 11/1993 | Hattori | 318/479 |
| 5,263,003 | 11/1993 | Lowles et al. | 365/230.03 |
| 5,282,099 | 1/1994 | Kawagoe et al. | 360/97.01 |
| 5,283,704 | 2/1994 | Reidenbach | 360/104 |
| 5,291,355 | 3/1994 | Hatch et al. | 360/97.01 |
| 5,291,584 | 3/1994 | Challa et al. | 364/200 |
| 5,329,491 | 7/1994 | Brown et al. | 365/185.33 |
| 5,337,202 | 8/1994 | Jabbari et al. | 360/97.01 |
| 5,345,352 | 9/1994 | Nakano | 360/97.01 |

OTHER PUBLICATIONS

Research Disclosure No. 302, New York "Insertion and Removal Of Cards With Power On While Not Disturbing The Rest Of The Machine" (Jun. 00, 1989).

IEEE Transactions on Components, Hybrids, and Manufacturing Technology, vol. 11, No. 4, Dec. 1988, New Your, pp. 576–584, XP105724, *Flow Visualization and Special Measurements in a Simulated Rigid Disk Drive*, Abrahamson, Koga & Eaton.

I–Therm 88 (Intersociety Conference on Thermal Phenomena in the Fabricationand Operation of Electronic Components), 11 May 1988, Los Angeles, GA, pp. 162–170, XP11602, *Flow and Thermal Fields in Channels Between Corotating Disks*, Torok & Gronseth.

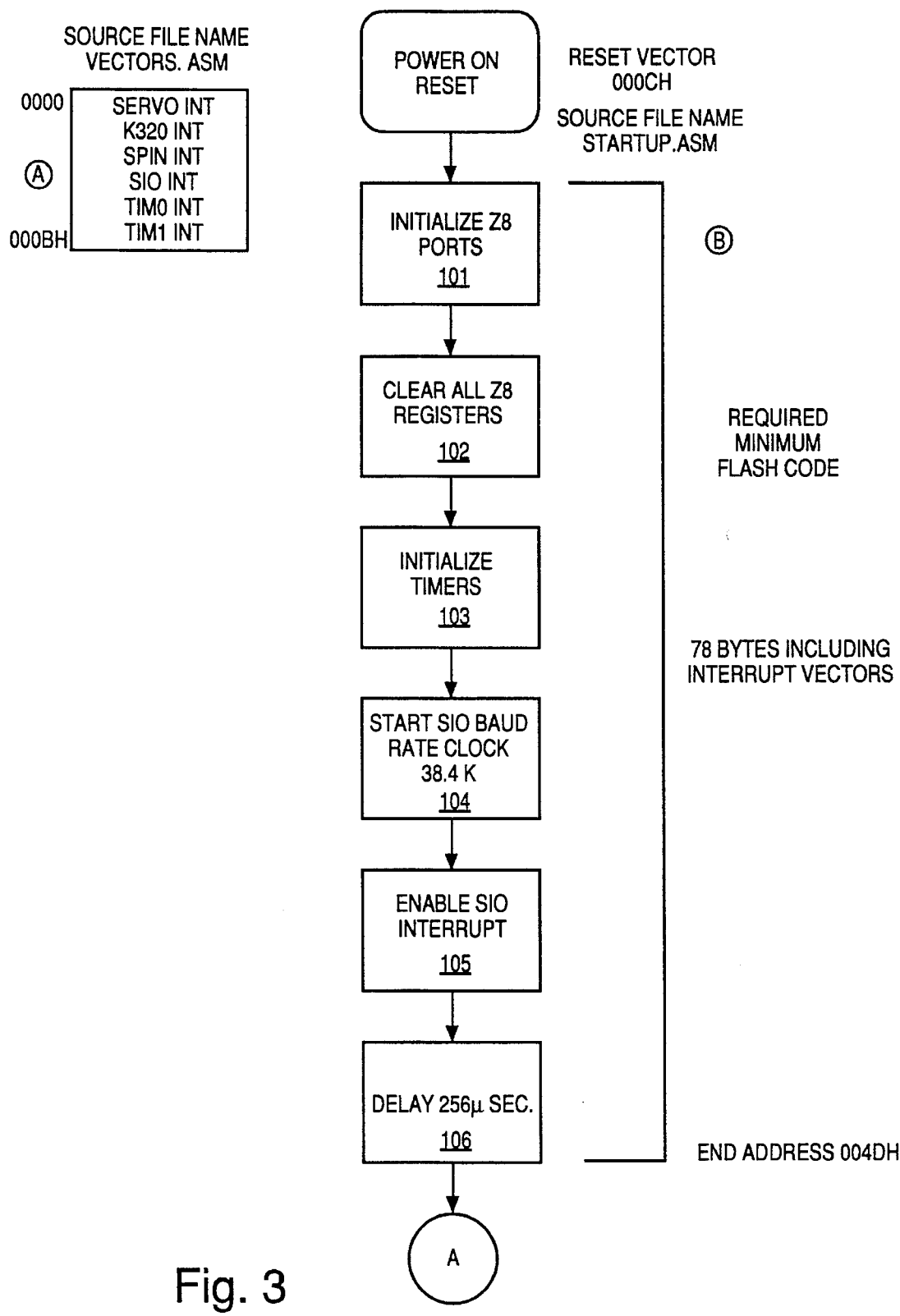

PERIPHERAL DEVICE CONTROL SYSTEM USING CHANGEABLE FIRMWARE IN A SINGLE FLASH MEMORY

This application is a continuation, of application Ser. No. 07/829,129, filed Jan. 31, 1992, now abandoned.

BACKGROUND OF THE INVENTION

1. Field of the Invention

This invention relates in general to peripheral device control systems, and relates more particularly to such systems having improved capabilities for modifying the firmware or microcode therein.

2. Prior Art

In many systems for the control of peripheral devices associated with computer systems there is a need to periodically modify or update the firmware in the control systems. Such need may arise during the development stage or during the commercial use stage, or both. Examples of computer peripheral device control systems which require such firmware modification are those associated with disk drives, tape drives, printers and modems. For instance, most current hard disk drive systems incorporate a single microcontroller and electrically programmable read only memory (EPROM) chips to provide the overall control hardware/firmware. This approach has been utilized from the early days of the hard disk drive and it has provided the lowest cost and most flexibility at the beginning of the design cycle. Firmware changes in hard disk drive systems are very common as a result of many factors. These factors include the fact that the hard disk drive is an electromechanical device; interface specifications change; more selftest functions are needed, and finally, human error occurs in the design process.

In that early period, when printed circuit board (PCB) space was not at a premium, the microcontroller chip and the EPROM were provided in what was known as Dual In-Line (DIP) packages. This approach not only provided the lowest cost, but also allowed the designer to use sockets on the PCB so that modifications to the firmware could be accomplished by replacing the EPROM without requiring any unsoldering or soldering.

The continuing evolution of hard disk drives has provided increasing memory capacities and an overall reduction in physical size. This has forced the designer to use Surface Mount Device (SMD) technology to provide the added functionality required to produce higher capacities with less PCB space. Most designers maintained the microcontroller/EPROM design architecture, but paid a high price for this architecture when firmware changes were required in the field. The cost difference between the two design approaches was on the average of 200% more for the SMD technology. This forced many disk drive system developers to commit to Read Only Memory (ROM) devices early in the design cycle to reduce costs. However, when a subsequent firmware change was required, greater costs were incurred. In the worst case, with the ROM soldered to the PCB, the ROM first had to be unsoldered from the PCB, the old ROM scrapped, and a new one soldered in its place.

Another problem encountered with some disk drive system designs is the location of the code memory chip itself. The memory chip may be buried inside the PCB, so that the PCB itself has to be removed before the memory chip can be accessed and changed, adding more cost to the firmware change process.

One approach to reduce the cost of firmware changes is to employ a single microcontroller, but add a small set of "BOOT" firmware which is mask fabricated into the microcontroller, and substitute a random access memory (RAM) chip in place of the EPROM. The masked BOOT code from the microcontroller is used to "spin up" the disk drive device and position the read/write heads over a special track on the disk that contains the remaining firmware which is then downloaded from the disk to the RAM. The BOOT firmware then turns control over to the RAM-based code.

When introduced, this technique was a breakthrough for cost vs firmware updates compared to the early EPROM technique. However, this approach still has disadvantages. For one, the designer needed to complete the BOOT code quickly in order to enable the microcontroller fabricator to complete the BOOT code masking process. Secondly, most of the disk drive hardware needed to be functioning in order to update the code on the disk. Thirdly, there is a long time delay involved in spinning up the disk and downloading the code, sometimes causing problem on fast systems at power on.

With the introduction of the flash memory chip in 1988, a solution for changeable firmware in disk drive systems was possible. Current flash memory chips fall into different types, 12 volt vs 5 volt reprogrammable, and bulk erase vs byte or page erasable. This type of memory device appeared to provide a good design approach to allow changeable firmware throughout the life of the disk drive. It would provide changeable firmware without the need to replace the chip, and no masked microcontroller BOOT firmware was needed. Other advantages over the RAM-based design was that very little hardware was needed in order to reprogram and no time delay was incurred on power up.

The use of flash memory in this environment did present two significant problems. The first was the cost of flash memory technology itself, and the second was the need to be able to reprogram the flash memory without any masked BOOT code. The cost issue involves consideration of the cost savings which can be obtained with the use of flash memory if firmware changes are needed. One approach would be to utilize two flash memory chips, one containing the BOOT code and the other containing the changeable firmware. However, this is not totally attractive because of the added space requirement for the second chip on an already crowded PCB. The present invention solves the second problem of changing firmware with only a single microcontroller and a single flash memory chip, without the use of any masked BOOT code.

SUMMARY OF THE PRESENT INVENTION

In accordance with the present invention, desired changes in system firmware in a peripheral device control system are accomplished without the need for any masked BOOT code through a novel interconnection of a single flash memory chip and a digital signal processor having an amount of RAM therein sufficient to store firmware BOOT code for controlling the updating of the changeable firmware in the flash memory.

At the time of assembly of the PCB containing the flash memory, this BOOT firmware is preprogrammed into the flash memory chip at specified locations. In operation, when it is desired to modify the changeable firmware in the flash memory, this preprogrammed BOOT code is read out of the flash memory into a RAM area of the digital signal processor. This BOOT code in the RAM can then be executed to control the writing of the modified functional firmware into the flash memory. This approach solves the problem that when code is being written into a flash memory, it is not possible to read from the flash memory; thus, it would not be possible to read any BOOT code from the flash memory itself while writing into it.

BRIEF DESCRIPTION OF THE DRAWINGS

FIGS. 3–10 are flow charts illustrating various phases of the operation of the invention.

DESCRIPTION OF THE PREFERRED EMBODIMENT

Figure 1:
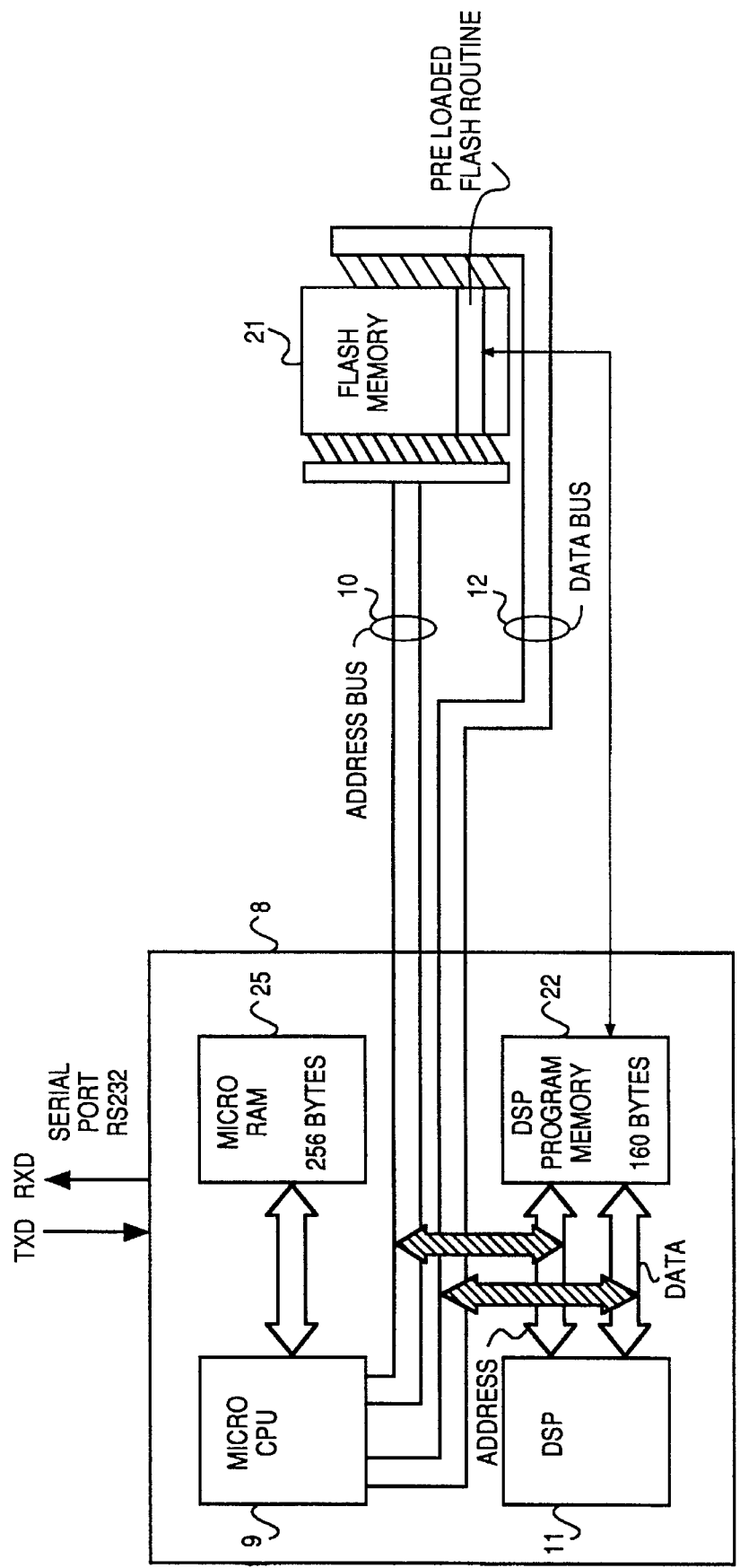
FIG. 1 is a block diagram of a peripheral device control system embodying the present invention.

FIG. 1 shows a block diagram of elements for one implementation of the present invention in connection with a disk drive system. Although the invention will be described in connection with a disk drive system, it will be understood that the invention is useful in control systems for other peripheral devices such as printers, tape drives and modems.

FIG. 1 shows a microprocessor 8 such as a Zilog type Z86C94. This unit contains a number of elements including a digital signal processor (DSP) 11 having associated therewith a RAM memory area 22. Microprocessor 8 also includes a central processing unit (CPU) 9 having associated therewith a RAM memory area 25. In a representative embodiment, memory 22 may have a capacity of 160 bytes and memory 25 has a capacity of 256 bytes. Information is transmitted to and from microprocessor 8 on a serial port by means of a transmit data (TXD) line and a receive data (RXD) line forming part of the well known standard RS232 interface. Microprocessor 8 operates to control one or more peripheral devices (not shown) such as a disk drive system in the present example.

The system of FIG. 1 also includes a flash memory 21 which interacts with microprocessor 8 as described above to store firmware code for operation of the disk drive system and provide for updating of that firmware as required by the user. As is known in the art, a flash memory is a type of non-volatile RAM.

Flash memory 21 may be an ATMEL type 29C256 flash memory device, a 5 volt, page programmable, 32k by 8 bit device. In the present embodiment, each page in flash memory 21 has 64 bytes, which results in 512 pages/device, and has a page programming time of 10 msec. The microprocessor runs at 20Mhz and the access time of flash memory 21 is 150 nSec. The timing for reading of the flash memory can be obtained without any wait state, but writing to the flash memory requires the microprocessor switch to a slower timing mode. Microprocessor 8 communicates with flash memory 21 over an address bus 10 and a data bus 12.

As mentioned above, when the microprocessor starts writing a page of data to the flash memory, the flash memory locks out all access to any other part of the memory. This can cause a problem with most microprocessors in that they must continue to execute code out of the same memory chip. The solution for this problem in the present invention is to allow the microcontroller to execute code from its own internal RAM 22.

When the user wants to change the firmware in memory 21, the microprocessor loads internal data RAM 22 with the flash memory BOOT code by moving preprogrammed control code from the flash memory preprogrammed BOOT area to RAM 22 on data bus 12 between memory 21 and microprocessor 8. The new firmware data to be loaded into memory 21 is then moved from the data port of the microprocessor (serial input or interface buffer) from memory 25 to the changeable portion of the flash memory, and the system waits for the flash memory to complete the 10m sec. programming time.

As discussed above, the flash memory is preprogrammed with the BOOT code offline on a flash memory programmer and the programmed flash memory is then secured to a PCB along with microprocessor 8.

Figure 2:
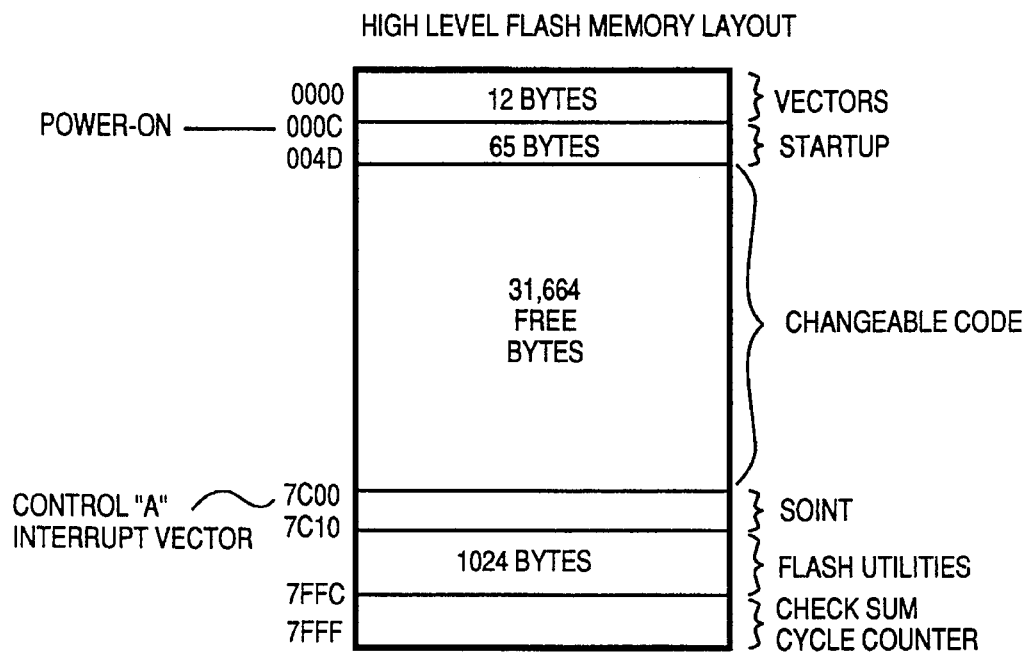
FIG. 2 is a representation of a typical distribution of the preprogrammed firmware and the changeable firmware in a flash memory chip in accordance with this invention.

FIG. 2 illustrates one typical organization of flash memory 21 including the preprogrammed portions or modules of firmware code. The first portion of memory 21 in FIG. 2 includes 12 bytes labeled "Vectors" and 65 bytes labeled "Startup." These 77 bytes are preprogrammed into memory 21 as described above and their function is shown in the flow chart of FIG. 3. At power on/reset, the microcontroller ports are initialized (block 101), the registers are cleared (block 102), the timers are initialized (block 103), and the serial input/output (SIO) baud rate clock is started (block 104). This clock is a serial baud generator which will recognize any input from the user and enable the SIO interrupt (block 105), followed by a predetermined time delay (block 106). The code for this power on/reset sequence is shown in pages 1 and 2 of the attached Appendix A.

The next portion of memory 21 in FIG. 2 is labeled "Changeable Code" and represents 31,664 bytes which store the changeable firmware which can be addressed and modified by the user.

The next preprogrammed portion of memory 21 that is utilized in the present invention is located at the high end of memory. Referring to FIG. 2, the flash memory resides starting at address 000 and extending to address 7FFF, which is 32,000 bytes if it is converted from hex to decimal. The flash memory portion beginning at address 7C00 is firmware that is preprogrammed into the memory in addition to the preprogrammed Vectors and Startup portions discussed above.

Figure 4:
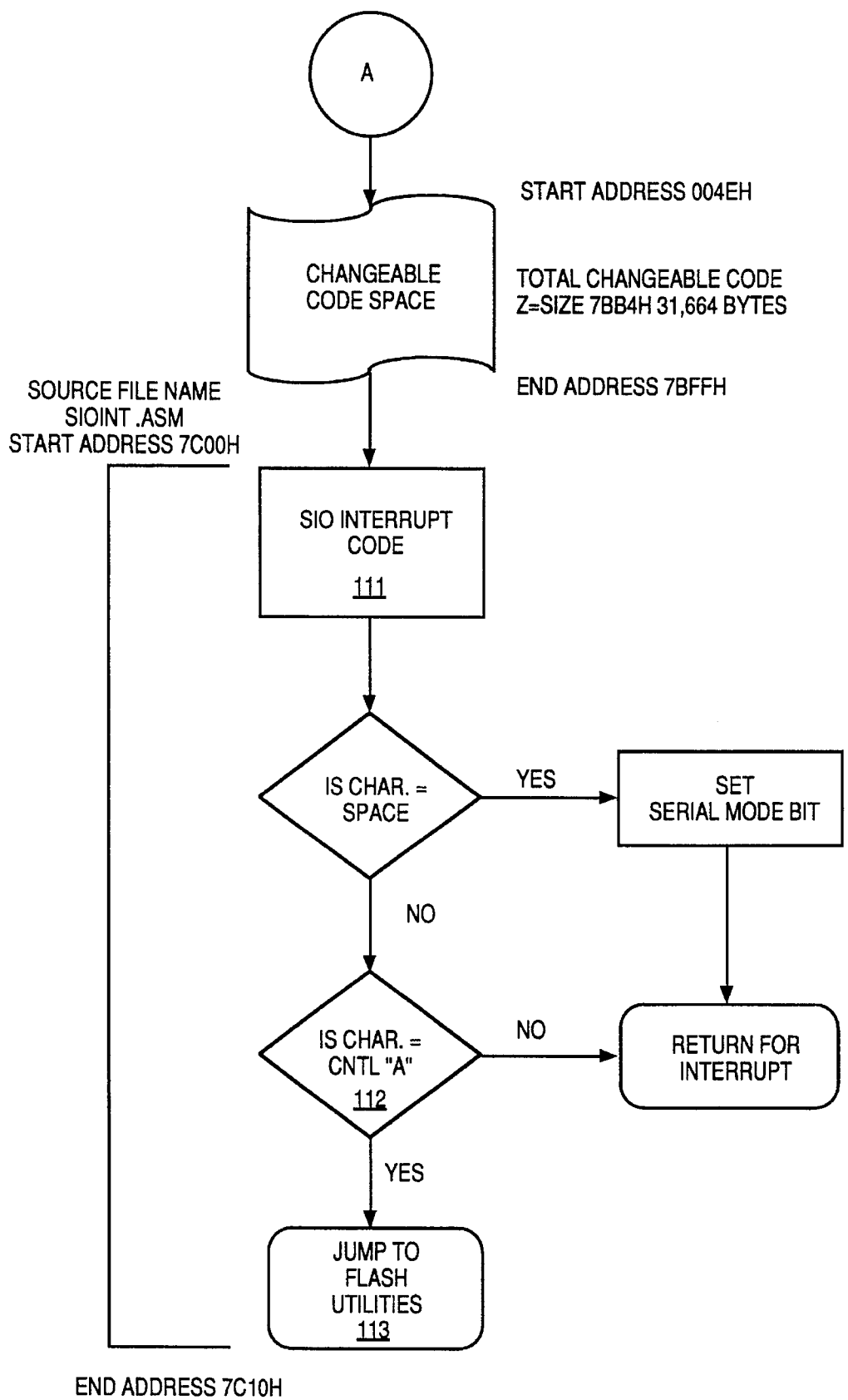

Referring to the flow chart of FIG. 4, the first part of this portion is 17 bytes of code labeled "SIOINT" in FIG. 2 (block 111 in FIG. 4) that determines whether an interrupt that was generated from the serial port was a Control A character (block 112) which will place the system in this programming mode. The code for this routine is shown on page 3 of Appendix A.

Figure 5:
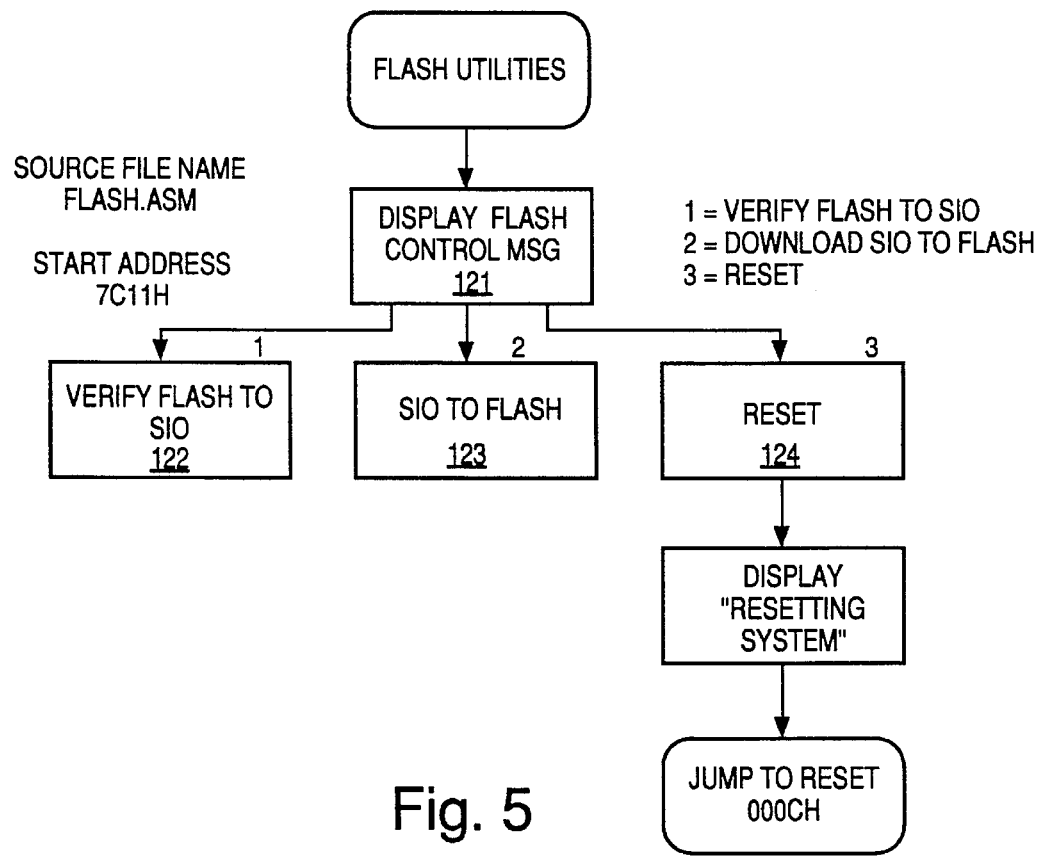

If the character was a Control A character, the system will go to the operation shown in the flow chart of FIG. 5, which is identified as the "Flash Utilities" (block 113) of 1024 bytes in FIG. 2 and which contains a number of routines. The system first displays a flash control message (block 121) for the user, these messages being "Verify Flash To SIO" (block 122), "SIO to Flash" (block 123) and "Reset" (block 124). The code for this display phase is shown on page 4 of Appendix A.

When it is desired to change any portion of the firmware in flash memory 21, it is necessary to read out the entire page of memory 21 in which the change is to be made, store it in a writable store such as RAM 25, download from the serial port the change or changes to be made on that page, including the address within the page, make the desired changes in the firmware in RAM 25 and then write the entire page (including the modified portion) back to flash memory 21. This procedure is required because it is not possible to make changes to less than single page of memory 21 by writing directly to that memory.

Figure 6A:
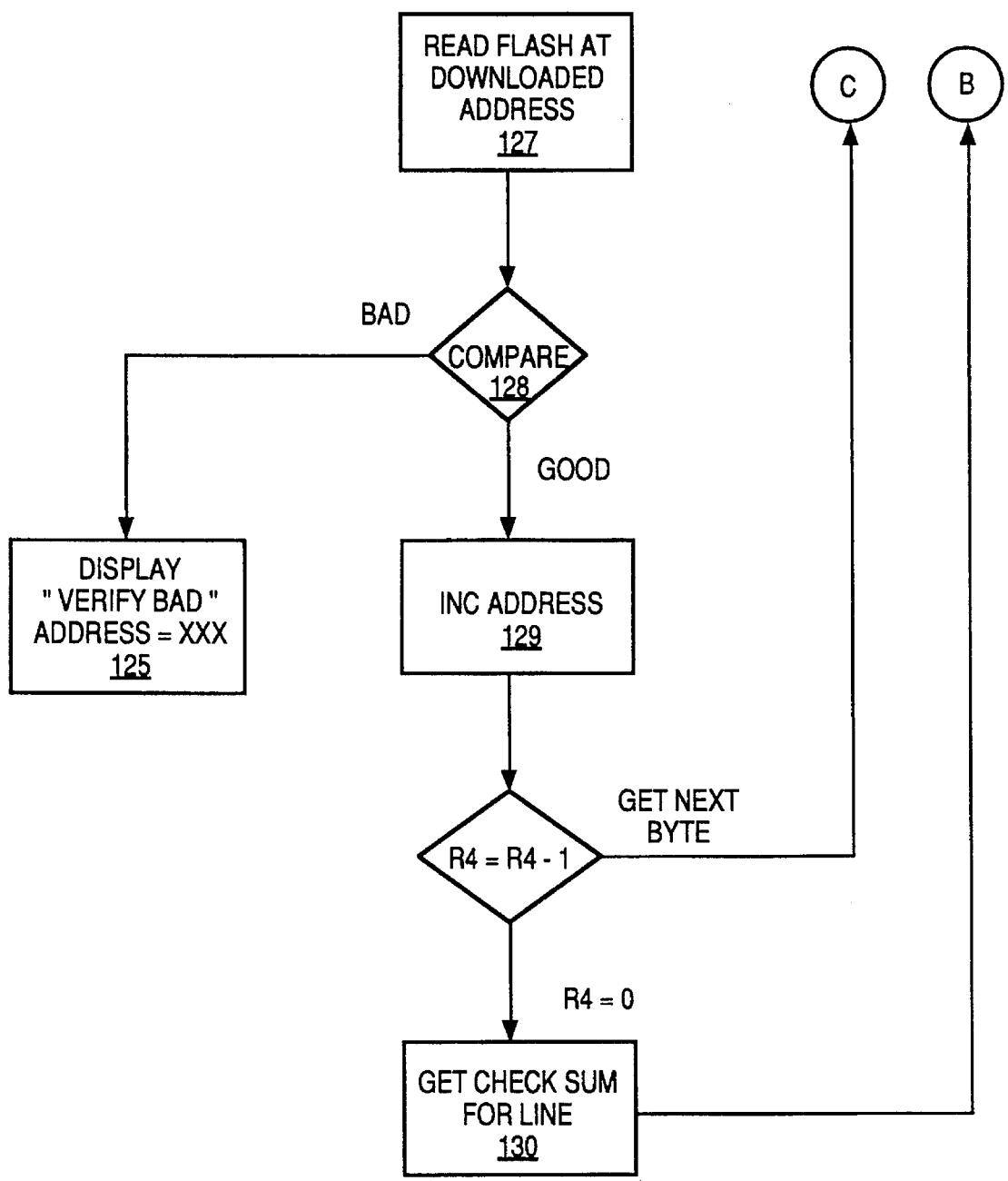

In the first routine, "Verify Flash To SIO" code can, be downloaded from the serial port and checked to see if the code to be put into the changeable area of the flash memory is the same as the code already in the memory. This is useful because at times a user is not certain what revision level of code is in the memory. This utility compares every byte to be sent with each byte residing in the memory, based on the memory address, before it rewrites anything in the changeable code area. Referring to FIG. 6A, the flash memory is READ at the downloaded flash memory address (block 127) and a comparison made (block 128). If any of the compared bytes do not match, the system will notify the user that there is a verified error at a specified address, that the byte it read and the byte that was to be sent to that address do not match. This is shown in FIG. 6A where the system sends a message "Verify Bad" (block 125) at the specified address if the compared bytes do not match.

Figure 6B:
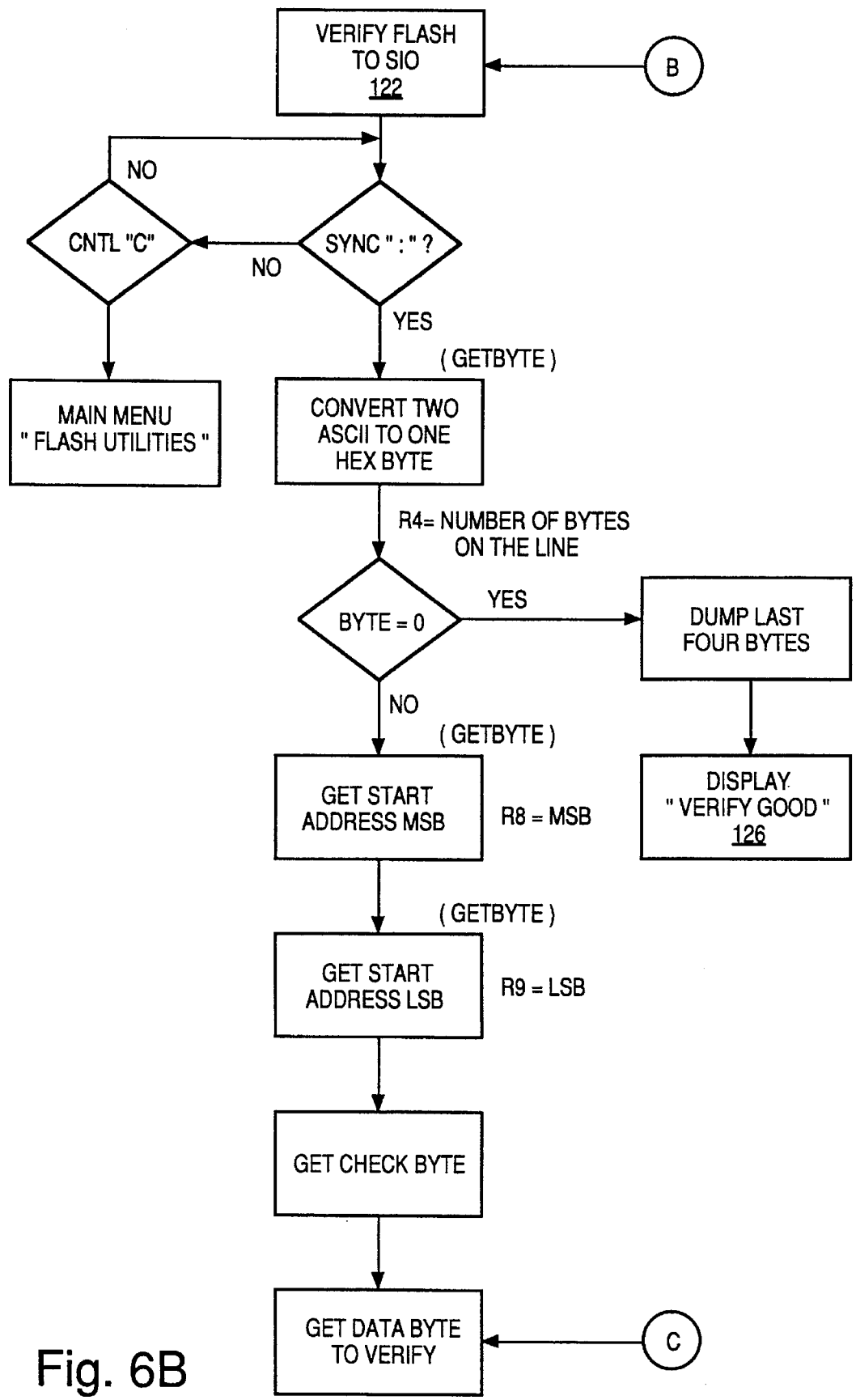

If the comparison in block 128 is good, the system increments the address (block 129) and proceeds to obtain the next byte by way of routine C shown in FIG. 6B. When the byte counter (Register 4) reaches zero, indicating there are no bytes remaining on that line in the flash memory, the check sum for that line is obtained (block 130, FIG. 6A) and the system proceeds to routine B shown in FIG. 6B. If all compared bytes are good, the system displays a "verify good" message (block 126, FIG. 6B). The code for this routine is listed on page 5 of Appendix A.

Utility number 3, "Reset" vectors the user back to, the start as a way to restart without turning power on and off again. This code for this procedure is shown at the top of page 6 of Appendix A.

Figure 7:
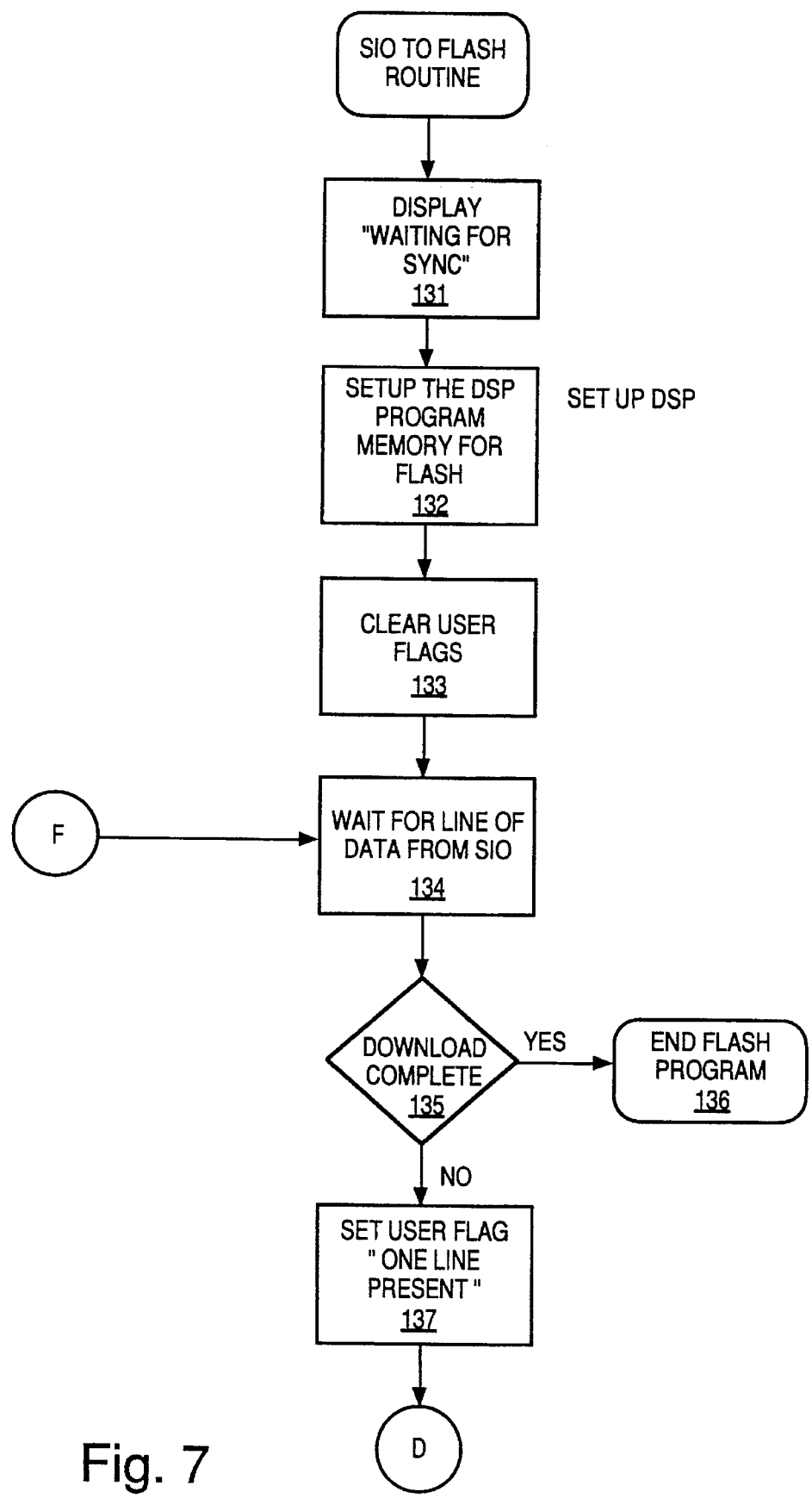
Figure 8:
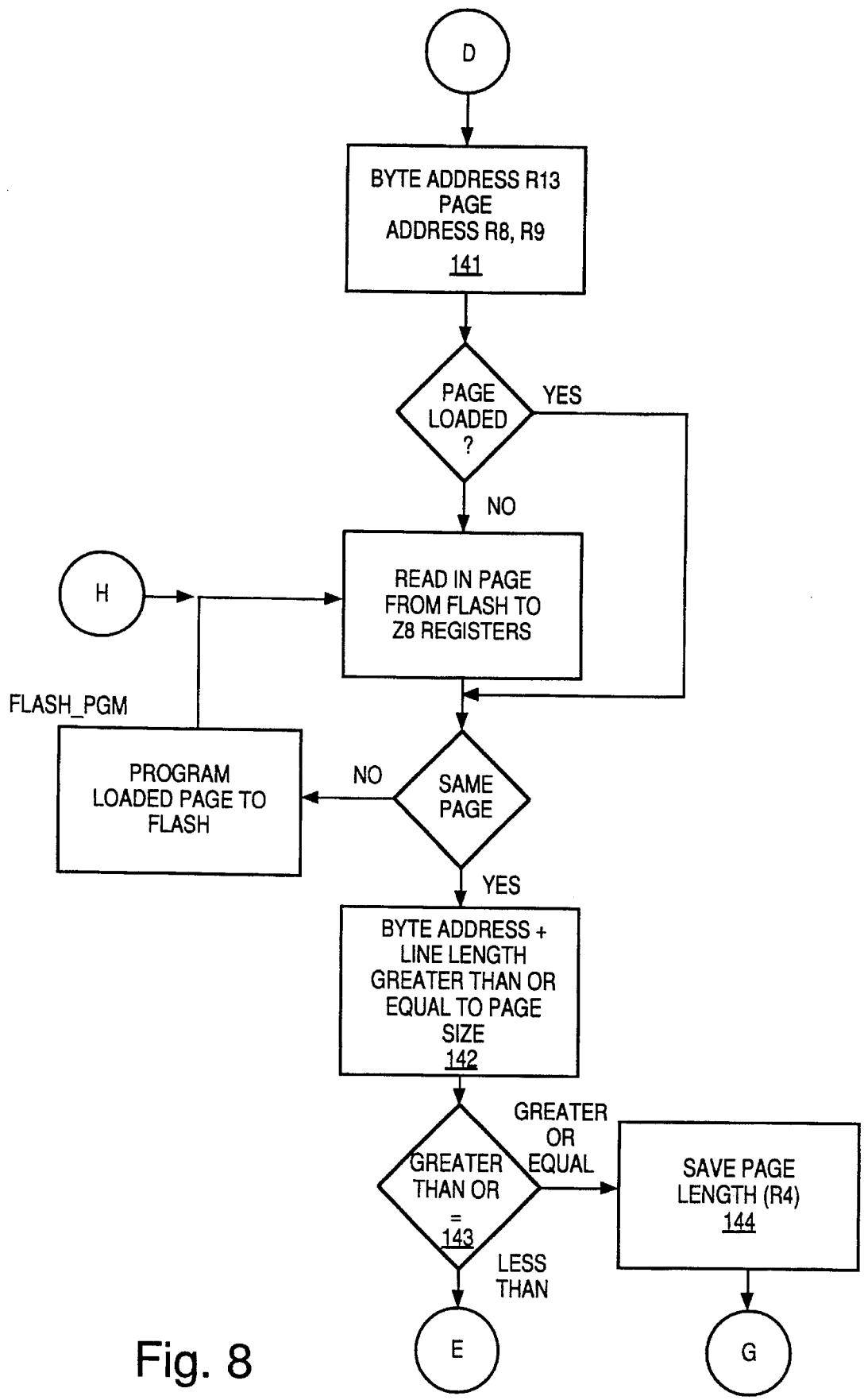
Figure 9:
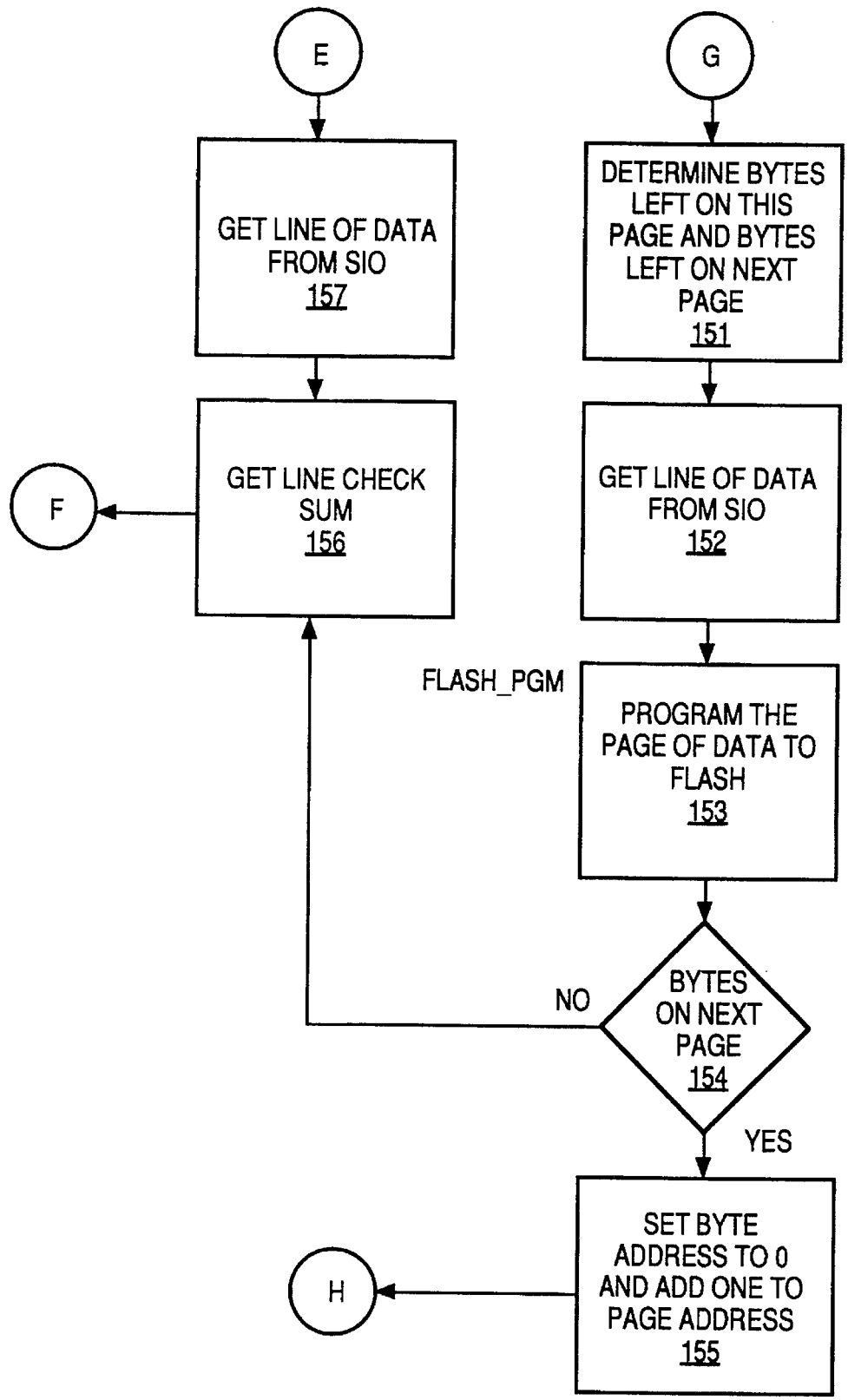

Utility number 2, "SIO to Flash", operates to move data from the serial port and write it into the free changeable code space in memory 21 based on the address provided by the user. This routine moves the data and handles all the re-programming of the flash memory. FIGS. 7, 8 and 9 show the steps executed when the user selects utility number 2. In FIG. 7, a message is displayed (block 131) telling the user he is waiting for a SYNC signal from the system. This is to insure synchronism with the system to enter the "Set Up DSP" phase (block 132).

The system is instructed EXECUTE FROM INTERNAL DATA MEMORY; this means do not execute code from the external flash memory, but execute code from DSP RAM memory 22. After clearing the system user flags (block 133); the system waits for a line of data from the serial input (block 134). This allows the moving of a specified amount of data from RAM 25 of the microcontroller, preferably one line at a time, and writing it out to the changeable code portion of flash memory 21. If the transmitted line completes the requested loading (block 135), the system ends the flash loading (block 136). If there are more lines to be loaded, the system sets the user flag to show "one line present" (block 137) and proceeds to routine D in FIG. 8. The code for this phase of the operation is shown on page 7 of Appendix A.

The flow chart of FIG. 8 of this routine includes obtaining the page address from registers R8 and R9 and the byte address within the addressed page from register R13 (block 141). After the first line is written, the system obtains the next line of code to be written and writes it to flash memory, repeating this until all writing is completed.

As stated earlier, there are two different flash memory architectures available commercially; one is referred to as bulk erase, which means that to reprogram the flash memory, the command "Erase" is given. A difficulty with that architecture is that if the power goes off after such an erase, the entire flash memory contents are gone. The present invention uses a flash memory technology which allows erasing on a page basis as in the above-identified Atmel memory. In that flash memory, each page is 64 bytes, so that the present system is never sensitive to power outages.

In the operation of loading code from RAM 25 to flash memory, two variables are provided by the system on the serial port. One variable is the byte address at which writing is to start and the length of the writing, and the other variable is the address of the page in which the user wants to write. Still referring to FIG. 8, the system checks (block 142) to determine if the byte address and line length is greater than the size of a page of data that has already been loaded into RAM 25. If the new data involves a memory area which is larger than that loaded in RAM 25, it is desirable to load that portion which is already in RAM 25 into flash memory 21 before supplying the new data to RAM 25.

This is shown in FIG. 8 where the size of the code to be loaded is compared with a page size. If the comparison indicates an "equal to or greater than" condition (block 143), the page length is saved in register 4 (block 144) and the system proceeds with routine G shown in FIG. 9. The system determines (block 151) the number of bytes remaining on the present page and the number of bytes on the next page. The next step is to obtain a line of data from the serial port (SIO) (block 152) and load it into RAM 25 to complete a page of data in that RAM. This page of data is then programmed from RAM 25 to flash memory 21 (block 153) and the system then checks (block 154) to determine if there are additional bytes of code on the next page for that load. If so, the byte address in RAM 25 is set back to zero and the page address is advanced by one (block 155). The system then reads the next code into the newly designated page address and continues in this manner until all data has been written to memory 21.

The system then proceeds to obtain the line check sum (block 156) which involves a known error detection technique in which a check sum of the bytes on each line of code downloaded from RAM 25 to memory 21 is obtained and compared with the number of bytes intended to be loaded. If the check sum indicates a proper byte count, the system returns by routine F to block 134 of FIG. 7 to wait for the next line of data from the serial port.

In FIG. 8, if the comparison in block 143 indicates a "less than" condition, the system proceeds to routine E in FIG. 9 to obtain a new line of data (block 157) from the said input.

Figure 10:
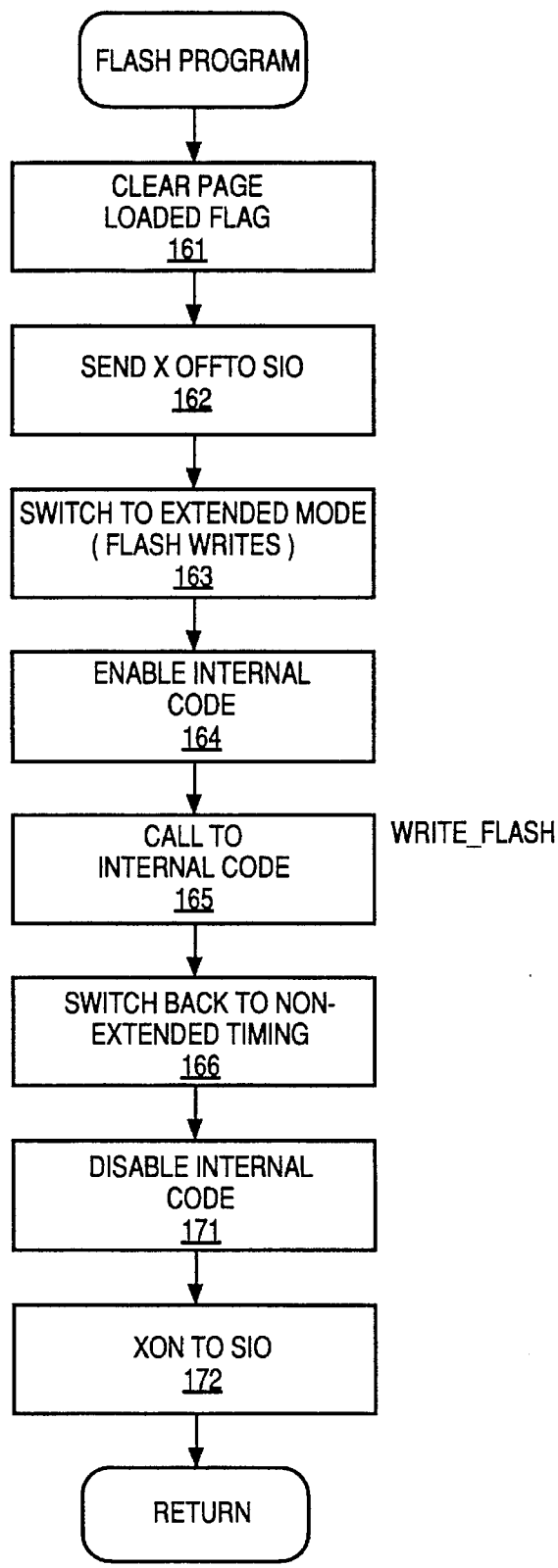

When an address is downloaded, the address might not be an address that is on a page boundary. Thus, the system needs two parameters from the downloaded program; the page address, which one of the 512-pages, and which byte in that page is the writing to start on. If the system is downloading and it is not on a page boundary, the downloading could begin in the middle of a page and extend through another page. The present system detects an attempt to cross page boundaries and holds up further downloading, as shown in FIG. 10. When the system determines that it is over a page boundary, it must be prevented from sending additional data because the serial download is an asynchronous operation which is not clocked.

To stop data from the system, after clearing the page loaded flag (block 161), an X-off character is sent to the system (block 162). This sets an internal code bit (block 163) telling the system to execute code out of the internal memory (blocks 164 and 165), dump the flash page, and switch back to non-extended timing (block 166). Then the internal code is disabled (block 171) and an X-on character is sent to the serial input (block 172), which tells the system to send additional code to the flash memory. This portion of the code is shown at the top of page 9 of Appendix A.

Page 1

APPENDIX A

```
2500 A.D. Z8 Macro Assembler  -  Version 4.05c
------------------------------------------------

Input Filename : STARTUP.asm
             Output Filename : STARTUP.obj
```

```
1194                              LIST
1195                              TITLE    'STARTUP.ASM'
1196                              GLOBALS ON
1197
1198                         ;*******************************************
1199                         ;*                                         *
1200                         ;      POWER-ON RESET ENTRY                *
1201                         ;      INITIALIZE PORTS & STACK            *
1202                         ;*******************************************
1203                         ;
1204  0000             RESET:
1205  0000  9F                     EI                         ; CLEAR INTERRUPT FLOP
1206  0001  8F                     DI                         ; Z8 CONTROL BANK
1207  0002  31 F0                  SRP   #RFBANKF             ; ADDRESS DATA BUS
1208  0004  8C 96                  LD    R.P01M,#P0_1_CONFIG  ; PORT 2 INIT DATA
1209  0006  E6 02 20               LD    P2,#P2DATA           ; CONFIGURE I/O PORT 2
1210  0009  6C 00                  LD    R.P2M,#P2CONFIG      ; PORT 3 INIT DATA
1211  000B  E6 03 FF               LD    P3,#P3DATA           ; CONFIGURE I/O PORT 3
1212  000E  7C 41                  LD    R.P3M,#P3CONFIG      ; INTERRUPT PRIORITY REGISTER
1213  0010  9C 14                  LD    R.IPR,#14H           ; INT0(ST_CONV) HIGHEST PRIORITY
1214                                                          ; INT2(DOUT)#2
1215                                                          ; INT1(INT_320) #3
1216                                                          ; INT4(TIMER0) #4
1217                                                          ; INT5(TIMER1) #5
1218                                                          ; INT3(SIO) #6
1219
1220                         ;*******************************************
1221                         ;*                                         *
1222                         ;       CLEAR Z8 REGISTERS                 *
1223                         ;*******************************************
1224                         ;
1225  0012  FC 04                  LD    R15,#04              ; REGISTER STARTING ADDRESS
1226  0014             CLRREGS:
1227  0014  B1 EF                  CLR   @R15                 ; CLEAR REGISTER
1228  0016  FE                     INC   R15                  ; NEXT ADDRESS
1229  0017  A6 EF F0               CP    R15,#0F0H            ; LAST ADDRESS
1230  001A  EB F8                  JR    NE,CLRREGS           ; DO ALL REGISTERS
1231
1232  001C  EC 00                  LD    R.SPH,#>STACKTOP
1233  001E  FC F0                  LD    R.SPL,#<STACKTOP     ; INITIALIZE THE TOP OF STACK
1234                               PAGE
```

Page 2

APPENDIX A

```
1235        ;
1236        ;********************************************
1237        ;       INITIALIZE Z8 REGISTERS              *
1238        ;********************************************
1239        ;
1240  0020          WR_ERF  ERFABANK0,T2_PRESCALER,#00010011B
1247        /                                         ; T2 PRESCALER = 01 CTC MODE 8/16/24 BIT
1248  002D  B0 FA   CLR     IRQ                       ; CLEAR ANY PENDING INTERRUPTS
1249  002F  4C 01   LD      R.T0,#01H
1250  0031  5C 11   LD      R.PRE0,#11H               ; TIMER 0 PRESCALER
1251  0033  3C CA   LD      R.PRE1,#11001010B         ; TIMER 1 PRESCALER = 50 INTERNAL CLK, SINGLE PASS
1252  0035  1C 03   LD      R.TMR,#03H                ; START TIMER 0 SERIAL BAUD RATE CLOCK
1253                                                  ; 38.4K BAUD AT 20MHZ
1254
1255  0037  31 10   SRP     #RFBANK1                  ; SET REGISTER POINTER TO BANK1
1256  0039  0C 80   LD      R0,#HI.MSB                ; CHIP SELECT OF 320=80XXH
1257  003B          ENABLE  SIOINT                    ; ENABLE SIO INTERRUPT
1263  003E  9F      EI
1264  003F  DELAY_START:
1265  003F  FA FE   DJNZ    R15,DELAY_START           ; DELAY 256US ALLOW ONE CHARACTOR INT.
1266  0041          END
```

Lines Assembled : 1266    Assembly Errors : 0

APPENDIX A

```
2500 A.D. Z8 Macro Assembler  -  Version 4.05c
-----------------------------------------------

Input Filename : SIOINT.asm
                Output Filename : SIOINT.obj
```

```
1195                              LIST
1196                              TITLE   'SIOINT.ASM'
1197                              GLOBALS ON
1198  0000          SIO_CODE:     SECTION
1199                         ;
1200                         ;************************************************
1201                         ;       EXTERNAL LABELS                          *
1202                         ;************************************************
1203                         ;
1204                              EXTERN  C_FLASH                ; FLASH
1205                         ;
1206                         ;************************************************
1207                         ;       SERIAL PORT INTERRUPT VECTOR             *
1208                         ;************************************************
1209  0000          SIO_VECTOR:
1210  0000  A6 F0 01              CP      SIO,#01H             ; CONTROL "A" CHARACTOR
1211  0003  6D 00 00              JP      EQ,C_FLASH           ; GO TO FLASH CODE
1212  0006  A6 F0 20              CP      SIO,#SPACE           ; IS CHARACTOR THE SELECT CHARACTER
1213  0009  EB 03                 JR      NE,SIO_VECTOR1       ; JUMP IF BAD INPUT
1214  000B                        SETB    SERIALMODE           ; SAY SERIAL MODE SELECTED
1218  000E          SIO_VECTOR1:
1219  000E  8F                    DI                           ; TURN OFF IRQ
1220  000F  BF                    IRET
1221  0010                        END
```

Lines Assembled : 1221        Assembly Errors : 0

Page 4

APPENDIX A

```
1239  0000              C_FLASH:
1240                    ;
1241                    ;*********************************************
1242                    ;                                             *
1243                    ;         DISPLAY FLASH SIGN ON MSG           *
1244                    ;                                             *
1245                    ;*********************************************
1246                    ;
1247  0000              FLASH_MENU:
1248  0000    8F                    DI                                    ; TURN OFF ALL INTERRUPTS
1249  0001    E6 FF F0              LD      SPL,#<STACKTOP                ; RESET STACK POINTER
1250  0004                          DISPLAY FLASH_MSG                     ; DISPLAY SIGN ON MESSAGE
1255  000B    CC 00                 LD      R12,#>F_CYC_CNT
1256  000D    DC 00                 LD      R13,#<F_CYC_CNT               ; FLASH COUNTER LOCATION
1257  000F    C2 FC                 LDC     R15,@RR12                     ; READ HIGH BYTE OF FLASH COUNTER
1258  0011    F9 AD                 LD      CYC_CNT_MSB,R15               ; SAVE FLASH CYCLE COUNT
1259  0013    D6 02 42              CALL    HEX_ASCII                     ; OUTPUT BYTE TO SIO
1260  0016    A0 EC                 INCW    RR12
1261  0018    C2 FC                 LDC     R15,@RR12                     ; READ LOW BYTE OF FLASH COUNTER
1262  001A    F9 AE                 LD      CYC_CNT_LSB,R15               ; SAVE CYCLE COUNT LSB
1263  001C    D6 02 42              CALL    HEX_ASCII                     ; OUTPUT BYTE TO SIO
1264  001F    A0 EA                 INCW    RR10
1265  0021    D6 02 B5              CALL    OUTSTRING                     ; OUTPUT CHECK SUM MSG
1266  0024    A0 EC                 INCW    RR12                          ; POINT TO FLASH CHECK SUM BYTES
1267  0026    C2 FC                 LDC     R15,@RR12                     ; GET CHECK SUM HIGH BYTE
1268  0028    D6 02 42              CALL    HEX_ASCII                     ; OUTPUT BYTE TO SIO
1269  002B    A0 EC                 INCW    RR12
1270  002D    C2 FC                 LDC     R15,@RR12                     ; GET CHECK SUM LOW BYTE
1271  002F    D6 02 42              CALL    HEX_ASCII                     ; OUTPUT BYTE TO SIO
1272  0032    A0 EA                 INCW    RR10
1273  0034    D6 02 B5              CALL    OUTSTRING                     ; OUTPUT COMMAND MENU.
1274  0037              FLASH_MENU1:
1275  0037    56 FA F7              AND     IRQ,#0F7H                     ; CLEAR ANY PENDING INPUTS
1276  003A    D6 02 9F              CALL    IN                            ; WAIT FOR AN INPUT ON SIO
1277  003D    A6 EF 31              CP      R15,#'1'
1278  0040    6B 00                 JR      EQ,VER_FLASH                  ; DO FLASH VERIFY
1279  0042    A6 EF 32              CP      R15,#'2'
1280  0045    6B 5C                 JR      EQ,FLASH                      ; PROGRAM FLASH
1281  0047    A6 EF 33              CP      R15,#'3'
1282  004A    6D 01 00              JP      EQ,RESET_MSG                  ; RESET CODE
1283  004D    8B E8                 JR      FLASH_MENU1                   ; BAD INPUT TRY AGAIN
1284                                PAGE
```

Page 5

APPENDIX A

```
;****************************************************
;                                                    *
;           VERFIY FLASH TO SIO DATA                  *
;                                                    *
;****************************************************
;
1285
1286
1287
1288
1289
1290  004F              VER_FLASH:
1291  004F  A0 EA              INCW    RR10
1292  0051  D6 02 85           CALL    OUTSTRING       ; OUTPUT "WAITTING FOR SYNC."
1293  0054        ,       VER1:
1294  0054  D6 01 F2           CALL    GET_HEADER      ; R4=LINE LENGHT R8,R9 ADDRESS
1295  0057  7B 40              JR      C,VER_GOOD      ; DONE, VERFIY IS GOOD
1296  0059              VER2:
1297  0059  D6 02 6F           CALL    GETBYTE         ; GET A BYTE FROM THE SIO
1298  005C  C2 D8              LDC     R13,@RR8        ; READ FLASH
1299  005E  A2 FD              CP      R15,R13
1300  0060  EB 09              JR      NE,VER_BAD      ; BYTES EQUAL ?
1301  0062  A0 EB              INCW    RR8             ; YES NEXT BYTE
1302  0064  4A F3              DJNZ    R4,VER2         ; CHECK ALL BYTES ON THIS LINE
1303  0066  D6 02 6F           CALL    GETBYTE         ; DUMP CS
1304  0069  8B E9              JR      VER1            ; GET NEXT LINE OF DATA
1305  006B              VER_BAD:
1306  006B  70 EF              PUSH    R15             ; SAVE BYTE IN ERROR
1307  006D  FC 03              LD      R15,#03H        ; CONTROL C TO STOP DOWNLOAD
1308  006F  D6 02 AA           CALL    OUT
1309  0072              DISPLAY FSH_VER_BAD_MSG        ; OUTPUT VERIFY BAD MSG
1314  0079  F8 E8              LD      R15,R8
1315  007B  D6 02 42           CALL    HEX_ASCII       ; OUTPUT ADDRESS MSB
1316  007E  F8 E9              LD      R15,R9
1317  0080  D6 02 42           CALL    HEX_ASCII       ; OUTPUT ADDRESS LSB
1318  0083  FC 3D              LD      R15,#'='
1319  0085  D6 02 AA           CALL    OUT             ; EQUALS
1320  0088  F8 ED              LD      R15,R13
1321  008A  D6 02 42           CALL    HEX_ASCII       ; OUTPUT FLASH BYTE
1322  008D  FC 20              LD      R15,#20H
1323  008F  D6 02 AA           CALL    OUT             ; SPACE
1324  0092  50 EF              POP     R15
1325  0094  D6 02 42           CALL    HEX_ASCII       ; OUTPUT SIO BYTE
1326  0097  8B 07              JR      VER_DONE
1327  0099              VER_GOOD:
1328  0099              DISPLAY FSH_VER_MSG            ; DISPALY VERFIY GOOD MSG
1333  00A0              VER_DONE:
1334  00A0  8D 00 00           JP      FLASH_MENU      ; MAIN MENU
1335                          PAGE
```

Page 6

APPENDIX A

```
;*******************************************
;                                           *
;           RESET SYSTEM                    *
;                                           *
;*******************************************
```

| 1396 | | | | | | |
|---|---|---|---|---|---|---|
| 1397 | | | | | | |
| 1398 | | | | | | |
| 1399 | | | | | | |
| 1400 | | | RESET_MSG: | | | |
| 1401 | 0100 | | DISPLAY | FSH_RST_MSG | | ; OUTPUT "RESETTING SYSTEM" |
| 1402 | 0100 | | JP | RESET | | ; RESET CODE |
| 1407 | 0107 | 8D 00 00 | | | | |
| 1408 | | | ; | | | |
| 1409 | | | | | | |

```
;*******************************************
;                                           *
;   UPDATE FLASH WITH CURRENT PAGE OF DATA  *
;                                           *
;*******************************************
```

| 1410 | | | | | | |
|---|---|---|---|---|---|---|
| 1411 | | | | | | |
| 1412 | | | | | | |
| 1413 | | | UPDATE_FLASH: | | | |
| 1414 | 010A | | CALL | FLASH_PGM | | ; PROGRAM FLASH |
| 1415 | 010A | D6 01 9F | JR | FLASH2 | | ; WAIT FOR MORE DATA |
| 1416 | 010D | 8B B4 | | | | |

```
;*******************************************
;                                           *
;           END THE FLASH PROGRAM           *
;                                           *
;*******************************************
```

| 1417 | | | | | | |
|---|---|---|---|---|---|---|
| 1418 | | | | | | |
| 1419 | | | | | | |
| 1420 | | | | | | |
| 1421 | | | | | | |
| 1422 | | | FLASH_END: | | | |
| 1423 | 010F | | LJNBIT | UFLAG2,FLASH_MENU | | ; NO DATA TO PROGRAM |
| 1424 | 010F | | DISPLAY | FSH_COMP_MSG | | ; SAY DONE WITH DOWNLOAD |
| 1429 | 0115 | | JNBIT | UFLAG1,FLASH_END1 | | ; PAGE ALREADY PROGRAMMED |
| 1434 | 011C | | CALL | FLASH_PGM | | ; SAVE LAST PAGE TO FLASH |
| 1439 | 0121 | D6 01 9F | | | | |
| 1440 | 0124 | | FLASH_END1: | | | |
| 1441 | 0124 | B0 AB | CLR | CS_MSB | | ; CLEAR CHECK SUM BYTES |
| 1442 | 0126 | B0 AC | CLR | CS_LSB | | ; |
| 1443 | 0128 | B0 E8 | CLR | R8 | | ; START AT ADDRESS ZERO TO GET CHECK SUM |
| 1444 | 012A | B0 E9 | CLR | R9 | | |
| 1445 | 012C | | FLASH_END2: | | | |
| 1446 | 012C | C2 F8 | LDC | R15,@RR8 | | ; GET BYTE FROM FLASH |
| 1447 | 012E | 04 EF AC | ADD | CS_LSB,R15 | | ; SUM IN CS |
| 1448 | 0131 | 16 AB 00 | ADC | CS_MSB,#00 | | ; UPDATE HIGH BYTE |
| 1449 | 0134 | A0 E8 | INCW | RR8 | | ; NEXT ADDRESS |
| 1450 | 0136 | A6 E8 7F | CP | R8,#7FH | | ; AT END OF MEMORY |
| 1451 | 0139 | EB F1 | JR | NE,FLASH_END2 | | ; NOT AT END KEEP SUMMING |
| 1452 | 013B | A6 E9 FF | CP | R9,#0FFH—ø̄FCH | | ; CHECK LOW BYTE OF ADDRESS |
| 1453 | 013E | EB EC | JR | NE,FLASH_END2 | | ; |
| 1454 | 0140 | 8C 00 | LD | R8,#>F_CYC_CNT | | ; GET ADDRESS OF FLASH COUNTER BYTES |
| 1455 | 0142 | 9C 00 | LD | R9,#<F_CYC_CNT | | ; MASK OUT PAGE |
| 1456 | 0144 | 56 E9 C0 | AND | R9,#0C0H | | ; GET THIS PAGE FROM FLASH |
| 1457 | 0147 | D6 01 66 | CALL | READ_PAGE | | ; INC COUNT |
| 1458 | 014A | 06 AE 01 | ADD | CYC_CNT_LSB,#01H | | ; MAKE DEC. NUMBER |
| 1459 | 014D | 40 AE | DA | CYC_CNT_LSB | | ; UPDATE MSB |
| 1460 | 014F | 16 AD 00 | ADC | CYC_CNT_MSB,#00H | | ; MAKE DEC. NUMBER |
| 1461 | 0152 | 40 AD | DA | CYC_CNT_MSB | | ; SAVE IN BUFFER MSB |
| 1462 | 0154 | E4 AD 5C | LD | 5CH,CYC_CNT_MSB | | ; SAVE IN BUFFER LSB |
| 1463 | 0157 | E4 AE 5D | LD | 5DH,CYC_CNT_LSB | | ; SAVE CHECK SUM MSB |
| 1464 | 015A | E4 AB 5E | LD | 5EH,CS_MSB | | ; SAVE CHECK SUM LSB |
| 1465 | 015D | E4 AC 5F | LD | 5FH,CS_LSB | | ; SAVE DATA TO FLASH |
| 1466 | 0160 | D6 01 9F | CALL | FLASH_PGM | | ; DISPLAY THE MENU |
| 1467 | 0163 | 8D 00 00 | JP | FLASH_MENU | | |
| 1468 | | | PAGE | | | |

Page 7

APPENDIX A

```
1336          ;*********************************************
1337          ;                                             *
1338          ;         GET DATA FROM SIO AND PROGRAM FLASH *
1339          ;                                             *
1340          ;                                             *
1341          ;*********************************************
1342          ;
1343  00A3        FLASH:
1344  00A3  A0 EA        INCW    RR10              ; POINT TO NEXT MSG
1345  00A5  D6 02 B5     CALL    OUTSTRING         ; OUPUT "WAITTING FOR SYNC"
1346  00A8  D6 01 7B     CALL    SETUP_DSP         ; DOWNLOAD THE DSP PROGRAM MEMORY
1347  00AB  56 FC FC     AND     FLAGS,#0FCH       ; RESET USER FLAGS
1348  00AE        FLASH1:
1349  00AE  D6 01 F2     CALL    GET_HEADER        ; R4=LINE LENGHT R8 =ADDRESS MSB R9 =LSB
1350  00B1  7B 5C        JR      C,FLASH_END
1351  00B3             SETB    UFLAG2            ; SAY WE HAVE ONE LINE OF DATA
1355  00B6  D8 E9        LD      R13,R9            ; GET BYTE ADDRESS
1356  00B8  56 ED 3F     AND     R13,#3FH          ; GET BYTE ADDRESS
1357  00BB  56 E9 C0     AND     R9,#0C0H          ; GET PAGE ADDRESS
1358  00BE             JBIT    UFLAG1,FLASH3     ; JUMP IF PAGE ALREADY LOADED
1363  00C3        FLASH2:
1364  00C3  D6 01 66     CALL    READ_PAGE         ; LOAD FLASH PAGE INTO Z8
1365  00C6        FLASH3:
1366  00C6  A2 80        CP      R8,R0             ; CHECK TO SEE IF STILL ON SAME PAGE
1367  00C8  EB 40        JR      NE,UPDATE_FLASH   ; NOT SAME SAVE CURRENT PAGE
1368  00CA  A2 91        CP      R9,R1             ; CHECK LSB
1369  00CC  EB 3C        JR      NE,UPDATE_FLASH   ; SAVE CURRENT PAGE
1370  00CE        FLASH4:
1371  00CE  B8 ED        LD      R11,R13           ; BYTE ADDRESS
1372  00D0  02 B4        ADD     R11,R4            ; START BYTE ADDRESS + BYTE COUNT
1373  00D2  A6 EB 40     CP      R11,#64           ; PAGE SIZE
1374  00D5  FB 08        JR      UGE,FLASH7        ; IF EQUAL OR GREATER THEN PROGRAM FLASH
1375  00D7        FLASH5:
1376  00D7  D6 02 35     CALL    GET_LINE          ; GET A LINE OF CODE FROM SIO
1377  00DA        FLASH6:
1378  00DA  D6 02 6F     CALL    GETBYTE           ; DUMP C.S BYTE
1379  00DD  8B CF        JR      FLASH1            ; NEXT LINE
1380  00DF        FLASH7:
1381  00DF  A8 E4        LD      R10,R4            ; SAVE LINE LENGHT
1382  00E1  4C 40        LD      R4,#64            ; PAGE LENGHT
1383  00E3  22 4D        SUB     R4,R13            ; NUMER OF BYTE LEFT ON THIS PAGE
1384  00E5  22 A4        SUB     R10,R4            ; R10=NUMBER OF BYTE NOT PROGRAMMED
1385  00E7  D6 02 35     CALL    GET_LINE          ; GET DATA FROM SIO
1386  00EA  D6 01 9F     CALL    FLASH_PGM         ; PROGRAM FLASH
1387  00ED  42 AA        OR      R10,R10           ; CHECK FOR END OF LINE
1388  00EF  68 E9        JR      Z,FLASH6
1389  00F1  48 EA        LD      R4,R10            ; NUMBER OF BYTES TO COMPLETE LINE
1390  00F3  B0 ED        CLR     R13               ; BYTE START ADDRESS ZERO
1391  00F5  56 E9 C0     AND     R9,#0C0H          ; PAGE ADDRESS
1392  00F8  06 E9 40     ADD     R9,#40H           ; NEXT PAGE
1393  00FB  16 E8 00     ADC     R8,#00            ; MSB
1394  00FE  8B C3        JR      FLASH2            ;
1395                    PAGE
```

Page 8

APPENDIX A

```
1469        ;****************************************************
1470        ;                                                    *
1471        ;           READ IN A PAGE OF DATA                   *
1472        ;                                                    *
1473        ;****************************************************
1474        ;
1475  0166       READ_PAGE:
1476  0166 BC 20      LD     R11,#20H           ; START ADDRESS
1477  0168 7C 40      LD     R7,#64             ; PAGE SIZE
1478  016A       READ_PAGE1:
1479  016A C3 B8      LDCI   @R11,@RR8          ; READ IN FROM FLASH AND SAVE
1480  016C 7A FC      DJNZ   R7,READ_PAGE1      ; GET ONE PAGE OF DATA FROM FLASH
1481  016E 80 E8      DECW   RR8
1482  0170 56 E9 C0   AND    R9,#0C0H           ; RESTORE PAGE ADDRESS
1483  0173 08 E8      LD     R0,R8              ; SAVE CURRENT PAGE ADDRESS MSB
1484  0175 18 E9      LD     R1,R9              ; SAVE LSB
1485  0177          SETB   UFLAG1             ; SAY PAGE LOADED
1489  017A AF         RET
1490        ;
1491        ;****************************************************
1492        ;                                                    *
1493        ;        DOWNLOAD DSP PROGRAM MEMORY TO              *
1494        ;        PROGRAM FLASH                               *
1495        ;                                                    *
1496        ;****************************************************
1497        ;
1498  017B       SETUP_DSP:
1499  017B B0 E9      CLR    R9                 ; DSP ADDRESS POINTER
1500  017D AC 01      LD     R10,#>UCODE        ; MSB OF UCODE ADDRESS
1501  017F BC C8      LD     R11,#<UCODE        ; LSB
1502  0181 CC 2A      LD     R12,#UCODE_END-UCODE ; NUMBER OF BYTES
1503  0183 31 1F      SRP    #RFBANK1~ERFABANKF ; SELECT ERF BANK F
1504  0185 E6 08 E4   LD     Z8_DSP_CNTL,#0E4H  ; SELECT ERF B
1505  0188 31 11      SRP    #RFBANK1~ERFABANK1 ; SELECT DSP MEMORY ADDRESS 10H
1506  018A       SETUP_DSP1:
1507  018A C3 9A      LDCI   @R9,@RR10          ; READ BYTE
1508  018C A6 E9 10   CP     R9,#10H            ; END OF BANK
1509  018F EB 06      JR     NE,SETUP_DSP2      ; NO
1510  0191 B0 E9      CLR    R9                 ; GET READY FOR NEW BANK
1511  0193 20 FD      INC    RP                 ; NEXT DSP MEMORY BANK
1512  0195 88 F3      JR     SETUP_DSP1         ; WRITE NEXT BANK
1513  0197       SETUP_DSP2:
1514  0197 CA F1      DJNZ   R12,SETUP_DSP1     ; WRITE ALL BYTES TO DSP MEMORY
1515  0199 31 1F      SRP    #RFBANK1~ERFABANKF ; SELECT ERF BANK F
1516  019B E6 08 E0   LD     Z8_DSP_CNTL,#0E0H  ; SELECT ERF A
1517  019E AF         RET
1518               PAGE
```

APPENDIX A

```
1519                    ;******************************************
1520                    ;*                                        *
1521                    ;    PROGRAM THE FLASH                    *
1522                    ;*                                        *
1523                    ;******************************************
1524                    ;
1525    019F            FLASH_PGM:
1526    019F                    CLRB    UFLAG1
1530    01A2    FC 13           LD      R15,#13H            ; XOFF
1531    01A4    D6 02 AA        CALL    OUT
1532    01A7    7C 40           LD      R7,#64              ; ONE PAGE
1533    01A9    CC 20           LD      R12,#20H            ; START ADDRESS OF NEW CODE BYTES IN REG.
1534    01AB    E6 F8 B6        LD      P01M,#0B6H          ; SWITH TO EXTENDED TIMING
1535    01AE    E6 F7 49        LD      P3M,#49H            ; ENABLE DM
1536    01B1    31 1F           SRP     #RFBANK1^ERFABANKF  ; SELECT ERF BANK F
1537    01B3    E6 08 F0        LD      Z8_DSP_CNTL,#0F0H   ; ENABLE INTERNAL CODE
1538    01B6    D6 FF 10        CALL    WRITE_FLASH         ; JUMP TO DSP/FLASH CODE
1539    01B9    E6 F8 96        LD      P01M,#96H           ;
1540    01BC    E6 08 E4        LD      Z8_DSP_CNTL,#0E4H   ; DISABLE INTERNAL CODE
1541    01BF    E6 F7 41        LD      P3M,#41H            ; DISBLE DM
1542    01C2    FC 11           LD      R15,#11H            ; XON
1543    01C4    D6 02 AA        CALL    OUT                 ;
1544    01C7    AF              RET
1545
1546                    ;******************************************
1547                    ;*                                        *
1548                    ;    FLASH CODE TO DOWNLOAD TO DSP MEMORY *
1549                    ;*                                        *
1550                    ;******************************************
1551    FF10            WRITE_FLASH:    EQU     0FF10H      ; INTERNAL CODE START ADDRESS
1552    01C8            UCODE:
1553    01C8    2C 55           LD      R2,#55H             ; SPECIAL ADDRESS TO UNLOCK FLASH
1554    01CA    3C 55           LD      R3,#55H             ; SPECIAL CODE
1555    01CC    FC AA           LD      R15,#0AAH           ;
1556    01CE    D2 F2           LDC     @RR2,R15            ;
1557    01D0    2C 2A           LD      R2,#2AH             ; NEXT SPECIAL ADDRESS
1558    01D2    3C AA           LD      R3,#0AAH            ;
1559    01D4    FC 55           LD      R15,#55H            ; WRITE CODE
1560    01D6    D2 F2           LDC     @RR2,R15            ;
1561    01D8    2C 55           LD      R2,#55H             ; NEXT ADDRESS
1562    01DA    3C 55           LD      R3,#55H             ;
1563    01DC    FC A0           LD      R15,#0A0H           ; FLASH IS NOW UNLOCKED FOR 1 PAGE OF NEW CODE
1564    01DE    D2 F2           LDC     @RR2,R15
1565    01E0            UCODE1:
1566    01E0    E3 FC           LD      R15,@R12            ; READ BYTE FOR Z8 REGISTERS
1567    01E2    CE              INC     R12                 ; NEXT BYTE ADDRESS
1568    01E3    D2 F0           LDC     @RR0,R15            ; WRITE BYTE TO FLASH
1569    01E5    A0 E0           INCW    RR0                 ; NEXT FLASH ADDRESS
1570    01E7    7A F7           DJNZ    R7,UCODE1           ; WRITE ONE PAGE
1571    01E9    80 E0           DECW    RR0                 ; LAST FLASH ADDRESS WRITTEN
1572    01EB            UCODE2:
1573    01EB    C2 E0           LDC     R14,@RR0            ; READ BACK LAST BYTE
1574    01ED    A2 EF           CP      R14,R15             ; WAIT FOR BYTE TO MATCH
1575    01EF    EB FA           JR      NE,UCODE2           ; JUMP IF NOT DONE
1576    01F1    AF              RET                         ; GET NEXT PAGE FROM SIO
1577    01F2            UCODE_END:
1578                            PAGE
```

I claim:

1. A peripheral device controller disposed on a printed circuit board located in a housing comprising:

a single flash memory chip disposed on the printed circuit board, the single flash memory chip including a preprogrammed portion having recorded control information stored therein and a changeable portion to receive and transmit changeable information;

a digital signal processor disposed on the printed circuit board, the digital signal processor including a memory store the memory store receiving said recorded control information from said preprogrammed portion of said single flash memory chip and storing said recorded control information in said memory store;

said digital signal processor executing the recorded control information from the memory store during firmware changes, and said digital signal processor transmitting said recorded control information back to the preprogrammed portion of said flash memory chip upon completion of said firmware changes.

2. A system in accordance with claim 1 wherein old information has been recorded in the changeable portion of the single flash memory chip and new information is to be recorded in said changeable portion further comprising:

means for comparing the old information recorded in said changeable portion with said new information prior to recording said new information in said changeable portion.

3. A system in accordance with claim 1 in which said changeable portion of said flash memory chip is divided into units, and means for supplying new information for recording in said changeable portion one unit at a time.

4. A system in accordance with claim 3 including means for determining whether said new information to be recorded includes data for recording in more than one of said units of said changeable portion of said flash memory chip.

5. A system in accordance with claim 4 including means for halting recording of said new information at an end of one of said units.

6. A system in accordance with claim 5 including means for resuming recording of said new information in a next unit adjacent to said one of said units.

7. A system in accordance with claim 1 in which said recording means and said reproducing means do not operate simultaneously on the recorded control information and the changeable information of said flash memory chip.

8. A peripheral device controller disposed on a printed circuit board located in a housing comprising:

a single flash memory chip disposed on the peripheral device controller, said single flash memory chip including a preprogrammed portion having recorded control information stored therein and a changeable portion to receive and transmit changeable information;

a distal signal processor including a first store, said first store receiving and temporarily storing recorded control information from the preprogrammed portion of the flash memory chip;

a second store disposed on said peripheral device controller, said second store temporarily storing the changeable information to be recorded in the changeable portion of the single flash memory chip; and a microprocessor responsive to said recorded control information in said first store, the microprocessor recording from said second store the information to be recorded in said changeable portion of said flash memory chip, the microprocessor transmitting the recorded control information back to the preprogrammed portion of the flash memory chip upon completion of the firmware changes.

9. A system in accordance with claim 8 wherein old information has been recorded in the changeable portion of the single flash memory chip and new information to be recorded in said changeable portion further comprising:

means for comparing the old information recorded in said changeable portion with the new information prior to recording said new information in said changeable portion.

10. A system in accordance with claim 8 in which said changeable portion of said flash memory chip is divided into units, and means for supplying new information for recording in said changeable portion one unit at a time.

11. A system in accordance with claim 10 including means for determining whether said new information to be recorded includes data for recording in more than one of said units of said changeable portion of said flash memory chip.

12. A system in accordance with claim 11 including means for halting recording of said new information at an end of one of said units.

13. A system in accordance with claim 12 including means for resuming recording of said new information in a next unit adjacent to said one of said units.

14. A system in accordance with claim 8 in which said recording means and said reproducing means do not operate simultaneously on contents of said flash memory chip.

15. A processor for controlling a peripheral, the processor disposed on a printed circuit board located in a housing containing the peripheral comprising:

a single flash memory chip disposed on the printed circuit board, the single flash memory chip having a preprogrammed portion containing BOOT code and a changeable portion containing changeable firmware;

a signal processor disposed on the processor, the signal processor having read alterable memory, the read alterable memory storing the BOOT code during firmware updates;

a bus transferring the BOOT code from the single flash memory chip to the read alterable memory;

the signal processor controlling writing of data to the changeable portion of said single flash memory chip by executing the BOOT code stored in the read alterable memory.

16. A microprocessor disposed on a printed circuit board located in a housing containing a peripheral comprising:

a single flash memory disposed on the printed circuit board, the single flash memory containing firmware data;

said single flash memory having a preprogrammed portion containing BOOT control code and a changeable portion;

a RAM disposed on the microprocessor, the RAM receiving BOOT control code, and the RAM storing the BOOT control code during firmware updates, the microprocessor loading said RAM with the BOOT control code, and said microprocessor executing said BOOT control code located in the RAM to write new firmware data to said changeable portion of said single flash memory.

17. A method for modifying micro-code on a peripheral device controller disposed on a printed circuit board located in a housing containing a peripheral comprising:

providing a single flash memory chip disposed on the printed circuit board;

dividing said single flash memory chip into a BOOT code section and a changeable section;

loading a RAM onboard said peripheral device controller with said BOOT code, the RAM storing said BOOT code during firmware updates;

reprogramming the single flash memory chip with BOOT code located in said RAM, said BOOT code controlling writing of data to the changeable section of said single flash memory chip;

providing modified firmware data; and executing said BOOT code from the RAM to write said modified firmware to said changeable portion of said single flash memory chip.

18. The method of claim 17 further comprising:

comparing the changeable section with the modified firmware prior to writing to the single flash memory chip.

19. The method of claim 17 wherein the changeable portion is divided into units and further comprising:

writing to said changeable portion one unit at a time.

20. A method for modifying a page of firmware on a controller disposed on a circuit board located in a housing containing a peripheral comprising:

providing a flash memory chip disposed on the circuit board;

dividing said flash memory chip into a BOOT code section and a changeable section;

locating the page of firmware in the changeable section of the flash memory chip;

loading a RAM disposed on the controller with the page of firmware;

executing a change or changes on the page of the firmware in the RAM to modify the firmware; and writing the modified firmware back to the changeable portion of said flash memory chip.

* * * * *

UNITED STATES PATENT AND TRADEMARK OFFICE
CERTIFICATE OF CORRECTION

PATENT NO.   : 5,596,738
DATED        : January 21, 1997
INVENTOR(S)  : Steven M. Pope It is certified that error appears in the above-indentified patent and that said Letters Patent is hereby corrected as shown below:

On the Title Page item [73] replace the second occurrence of "Teac" with --Tokyo--.

In column 2, line 5, under "OTHER PUBLICATIONS" replace "Modulesin" with --Modules in--.

On page 2, column 2, line 5, under "OTHER PUBLICATIONS" replace "Your" with --York--.

On page 2, column 2, line 10, under "OTHER PUBLICATIONS" replace "Fabricationand" with --Fabrication and--.

On page 2, column 2, line 11, under "OTHER PUBLICATIONS" replace "GA" with --CA--.

Signed and Sealed this

Twenty-seventh Day of July, 1999

Attest:

Attesting Officer

Q. TODD DICKINSON

Acting Commissioner of Patents and Trademarks